United States Patent
Rieger et al.

(10) Patent No.: US 7,913,777 B2
(45) Date of Patent: Mar. 29, 2011

(54) ROCK DRILL

(75) Inventors: Wolfgang Rieger, Weingarten (DE); Helmut Duscha, Ravensburg (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 12/160,634

(22) PCT Filed: Jul. 31, 2007

(86) PCT No.: PCT/EP2007/057889
§ 371 (c)(1),
(2), (4) Date: Jul. 11, 2008

(87) PCT Pub. No.: WO2008/037527
PCT Pub. Date: Apr. 3, 2008

(65) Prior Publication Data
US 2010/0163314 A1    Jul. 1, 2010

(30) Foreign Application Priority Data
Sep. 28, 2006   (DE) .......................... 10 2006 045 918

(51) Int. Cl.
*E21B 10/44* (2006.01)
(52) U.S. Cl. .......................... 175/323; 175/415; 418/224
(58) Field of Classification Search .................. 175/415, 175/323, 389, 394, 395; 405/259.1; 408/233, 408/224
See application file for complete search history.

(56) References Cited

U.S. PATENT DOCUMENTS

| 4,185,708 A | 1/1980 | Pawlik et al. |
| 6,588,519 B2 | 7/2003 | Knoller |
| 6,868,924 B2 | 3/2005 | Haussmann et al. |
| 2002/0046885 A1 | 4/2002 | Eichhorn et al. |
| 2005/0084352 A1 | 4/2005 | Borschert et al. |

FOREIGN PATENT DOCUMENTS

| DE | 27 35 855 | 3/1978 |
| DE | 36 26 523 | 2/1988 |
| DE | 100 53 344 | 5/2002 |
| DE | 102 07 257 | 9/2003 |
| EP | 1 184 115 | 3/2002 |
| WO | 01/88321 | 11/2001 |

*Primary Examiner* — William P Neuder
*Assistant Examiner* — Cathleen R Hutchins
(74) *Attorney, Agent, or Firm* — Michael J. Striker

(57) ABSTRACT

The invention relates to a rock drill (1) for rotational and percussive action, comprising a drill head (2), a conveying helix (3), a clamping shank and a longitudinal drill axis (L), wherein the drill head (2) has at least one secondary cutting element (5a, 5b) with a front and a rear side face (10a, 10b) and wherein the secondary cutting element (5a, 5b) has a center of mass (M) and a cutting edge (11), the center of mass (M) and the cutting edge (11) defining a first plane (E1), the front side face (10a) of the secondary cutting element (5a, 5b) defining a second plane (E2) and the rear side face (10b) of the secondary cutting element (5a, 5b) defining a third plane (E3). In this arrangement, the longitudinal drill axis (L) intersects the first plane (E1) at a first point of intersection (S1), the longitudinal drill axis (L) intersects the second plane (E2) and/or the third plane (E3) at a second and/or third point of intersection (S2, S3), the longitudinal drill axis (L) and the first plane (E1) form a first acute angle (1) in the direction of advancement (x) of the rock drill (1) and the longitudinal drill axis (L) and the second and/or third plane (E2, E3) form a second and/or third acute angle (2, 3) in the direction of advancement (x) of the rock drill (1).

13 Claims, 2 Drawing Sheets

ROCK DRILL

CROSS-REFERENCE TO RELATED APPLICATION

The invention described and claimed hereinbelow is also described in German Patent Application DE 10 2006 045 918.0 filed on Sep. 28, 2006. This German Patent Application, whose subject matter is incorporated here by reference, provides the basis for a claim of priority of invention under 35 U.S.C. 119(a)-(d).

Publication WO 2001/088321 A1 makes known a rock drill for rotational and percussive action, with a drill head, a conveying helix, a clamping shank, and a longitudinal drill axis, with which the drill head includes at least one secondary cutting element with a front and a rear lateral face, and with which the secondary cutting element has a center of mass and a cutting edge, the center of mass and the cutting edge defining a first plane, the front lateral face of the secondary cutting element defining a second plane, and the rear lateral face of the secondary cutting element defining a third plane. A rock drill of this type is to be improved in terms of the service life of its secondary cutting elements and its secondary cutting plates.

BACKGROUND OF THE INVENTION

The present invention relates to a rock drill.

The object of the present invention is to develop a rock drill with which the secondary cutting element(s) has/have a longer service life.

This object is attained, based on the features of the preamble of claim 1, by the characterizing features of claim 1. Advantageous refinements are described in the subclaims.

The inventive rock drill has a longitudinal drill axis, which intersects the first plane at a first intersection point and intersects the second and/or third planes at a second and/or third intersection point. The longitudinal drill axis and the first plane form a first acute angle in the direction of advancement of the rock drill, and the longitudinal drill axis and the second plane and/or the third plane form a second and/or third acute angle in the direction of advancement of the rock drill. Due to this orientation of the secondary cutting element in the direction toward the resultant force that acts on the secondary cutting element during the drilling operation—the resultant force being essentially composed of an axial component produced by the hammer pulse of the rock drill, and a tangential component produced by the rotation of the rock drill—the service life of the secondary cutting element may be increased considerably without changing any of the dimensions by directing the aforementioned, resultant force toward the center of mass of the secondary cutting element. The core of the present invention is therefore a spacial orientation of the secondary cutting element toward the force that acts on the secondary cutting element during hammer drill operation. Increased service life is attained by tilting the cutting element away from the direction of advancement, the cutting element being tilted via a slanted embedding in the front and/or rear lateral face such that the center of mass of the cutting element lies on a force vector that passes through the cutting edge.

According to the present invention, the first plane is oriented at an angle ($\alpha 1$) of approximately 10° to 25° relative to the longitudinal drill axis. As a result, an optimal orientation of the secondary cutting element in all conventional load situations is made possible.

The present invention also provides that the second plane and/or the third plane and/is oriented at an angle ($\alpha 2$, $\alpha 3$) of approximately 5° to 20° relative to the longitudinal drill axis. This makes it possible to roughly orient the secondary cutting element in an optimal manner.

According to the present invention, the angle ($\alpha 1$) between the first plane and the longitudinal drill axis is greater than the angle ($\alpha 2$, $\alpha 3$) between the second plane and/or the third plane and the longitudinal drill axis. This angular difference prevents the secondary cutting element from falling out of the groove in which it is retained, since every impact that the secondary cutting element experiences during operation causes the secondary cutting element to tilt in the groove in a braking or blocking manner.

The present invention also provides for a positioning of the secondary cutting element, with which the first intersection point is located in front of the center of mass, as viewed in the direction of advancement of the rock drill, and with which, in particular, the first intersection point is located between a drill bit tip and the center of mass. A compact design of the drill bit head is therefore ensured.

In addition, according to the present invention, a removal channel for drill cuttings is located in front of the cutting edge of the secondary cutting element, in the direction of rotation of the rock drill, the removal channel extending away from an end face of the drill head and into the conveying helix. It is therefore ensured that drill cuttings are carried away efficiently in front of the effectively operating, secondary cutting element.

The present invention also provides that the secondary cutting element is embedded in a groove formed in the drill head. This makes it possible to attach the secondary cutting element easily and effectively.

According to the present invention, lateral flanks of the groove define a fourth and a fifth plane, which have a fourth and a fifth intersection point with the longitudinal drill axis. This slanted orientation of the groove makes it possible to orient and/or position known cutting elements in a manner according to the present invention.

In addition, according to the present invention, the secondary cutting elements are located with mirror symmetry relative to the longitudinal drill axis. This ensures that the load placed on the rock drill is largely symmetrical.

Finally, the present invention provides that the secondary cutting element is designed as a component of a solid hard-metal head.

Further details of the present invention are described in the drawing with reference to schematically depicted exemplary embodiments.

DESCRIPTION OF THE PREFERRED EMBODIMENTS

Figure 1:
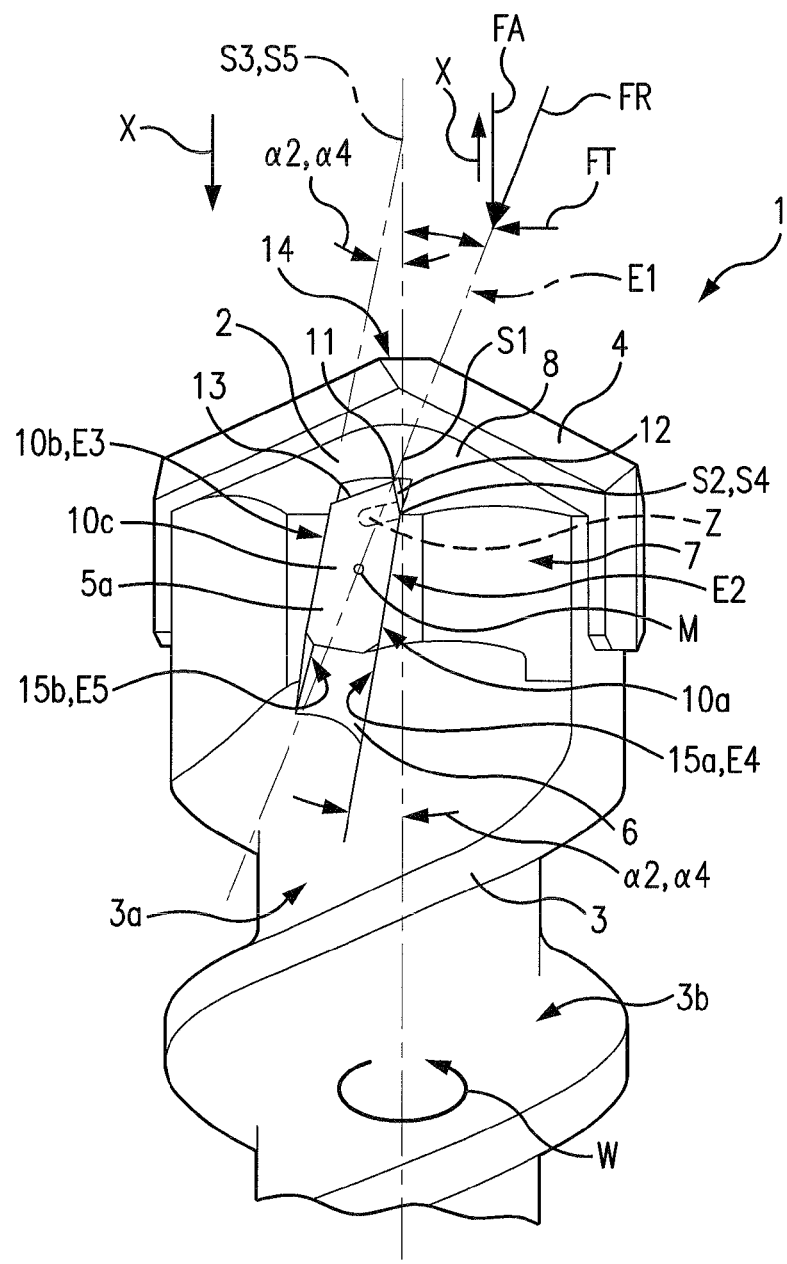
FIG. 1 shows a side view of an inventive rock drill.

A rock drill 1 is shown in a side view in FIG. 1, although only approximately the upper half of rock drill 1 is shown. Rock drill 1 includes a drill head 2, a conveying helix 3 that includes two conveying helical grooves 3a, 3b and abuts drill head 2, and a not-shown clamping shank. Rock drill 1 has a longitudinal drill axis L, along which rock drill 1 experiences a percussive advancement during operation, in a direction of advancement x. During operation, rock drill 1 simultaneously rotates around longitudinal drill axis L in a rotation direction w. Drill head 2 carries a main cutting element 4 and two secondary cutting elements 5a and 5b (see also FIG. 2). Main cutting element 4 and secondary cutting elements 5a and 5b are designed as cutting plates made of hard metal. A first removal channel 7 is located in front of secondary cutting element 5a, as viewed in rotation direction w, via which not-shown drill cuttings—which are produced mainly by secondary cutting element 5a—are carried away from end face 8 of drill head 2 in conveying helical groove 3a. A second removal channel 9 is located behind secondary cutting element 5a, as viewed in rotation direction w, via which not-shown drill cuttings—which are produced mainly by main cutting element 4—are carried away from end face 8 of drill head 2 in conveying helical groove 3a. Secondary cutting element 5a includes a front lateral face 10a, a rear lateral face 10b, an outer lateral face 10c, an inner lateral face 10d (see FIG. 2), a cutting edge 11, a face 12 located in front of cutting edge 11, and an exposed face 13 that is located behind cutting edge 11. Secondary cutting element 5a also has a center of mass M. Center of mass M and cutting edge 11 define a first plane E1. Plane E1 is intersected by longitudinal center axis L at a first intersection point S1, which—in the present exemplary embodiment—is located in direction of advancement x between a drill bit tip 14 and center of mass M of secondary cutting element 5a. Longitudinal drill axis L and plane E1 intersect to form a first intersection angle $\alpha 1=21°$. Front lateral face 10a of secondary cutting element 5a defines a second plane E2, which is intersected by longitudinal drill axis L at a second intersection point S2. Plane E2 and longitudinal drill axis L extend toward each other at an intersection angle $\alpha 2=10°$. Rear lateral face 10b of secondary cutting element 5a defines a third plane E3, which is intersected by longitudinal drill axis L at a third intersection point S3. Plane E3 and longitudinal drill axis L extend toward each other at an intersection angle $\alpha 3=10°$. Lateral flanks 15a and 15b of groove 6 define two further planes E4 and E5, which extend in parallel with each other. Plane E4 practically overlaps with plane E2 and is therefore located at an angle $\alpha 4=\alpha 2=10°$ relative to longitudinal drill axis L. An intersection point S4, at which plane E4 and longitudinal drill axis L intersect, therefore also corresponds to an intersection point S2. Accordingly, plane E5 practically overlaps with plane E3 and is therefore located at an angle $\alpha 5=\alpha 3=10°$ relative to longitudinal drill axis L. An intersection point S5, at which plane E5 and longitudinal drill axis L intersect, therefore also corresponds to an intersection point S3. During rotational and percussive action, secondary cutting element 5a—with its plane E1—is therefore oriented opposite to a resultant force FR, which is composed of an axial force component FA—the hammer pulse—and a tangential force component FT, which is produced by the rotation of the rock drill. Via this orientation of secondary cutting element 5a, which is nearly frontal and rotated by approximately 180° relative to the force vector of resultant force FR, secondary cutting element 5a may absorb the load on cutting edge 11 in an optimal manner, since the burst of force is oriented toward center of mass M of secondary cutting element 5a. In contrast to conventional secondary cutting elements, which are oriented parallel to the longitudinal drill axis, and which experience high shear and flexural loads during hammer drill operation, fissures in a zone Z are effectively prevented in this manner, since the lateral load on striking surface 12 is minimal. Secondary cutting element 5a therefore functions as a cutting plate that is slanted and has lateral faces 10a and 10b embedded on two sides. The descriptions above also apply for aforementioned second secondary cutting element 5b of rock drill 1.

Figure 2:
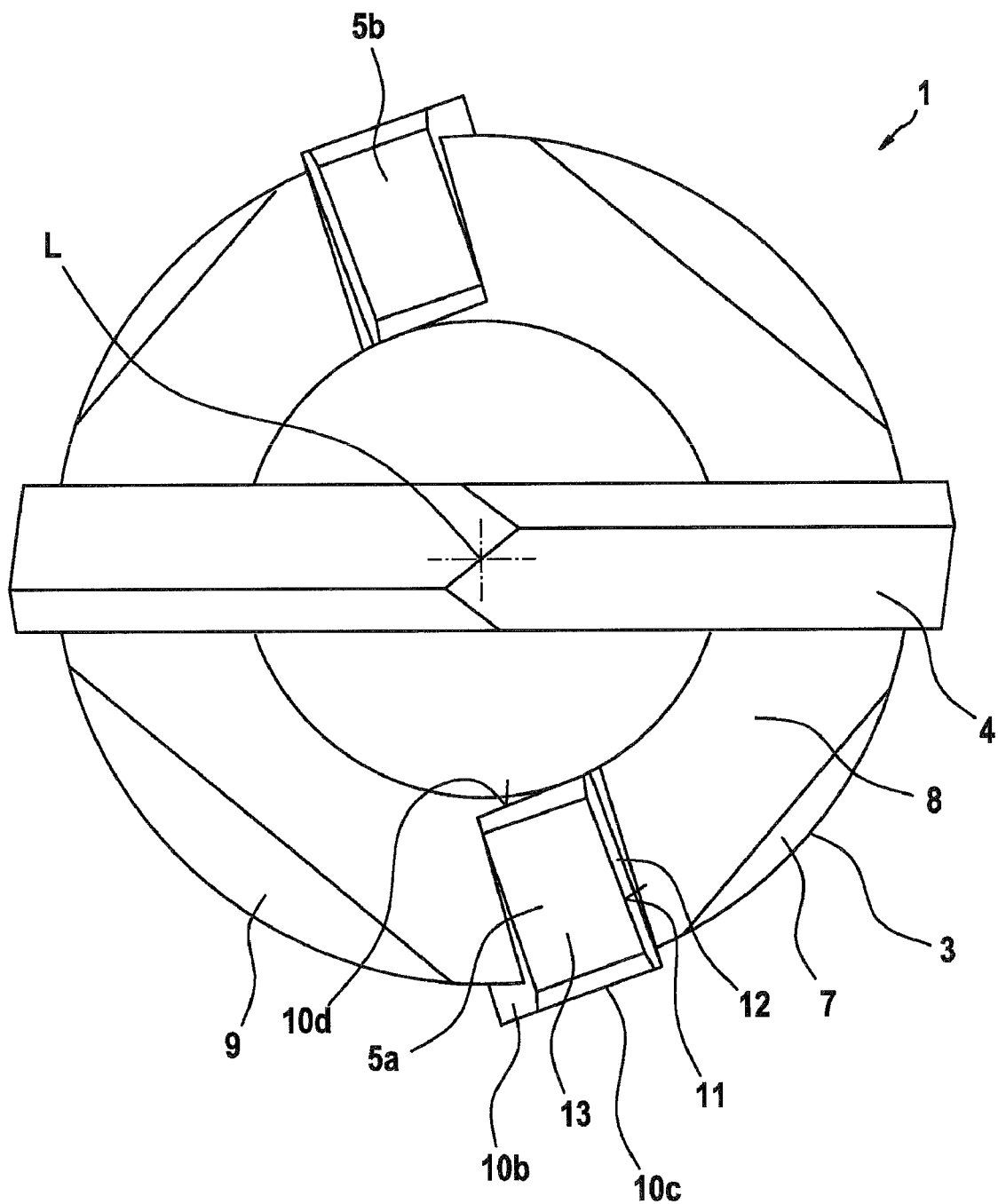
FIG. 2 shows a top view of a drill head of the rock drill shown in FIG. 1.

FIG. 2 shows a top view of rock drill 1 shown in FIG. 1, from an arrow direction II shown in FIG. 1. For clarity, only secondary cutting element 5a is labelled with additional reference numerals, in accordance with the description of FIG. 1. Secondary cutting element 5b is designed with mirror symmetry relative to longitudinal drill axis L.

The present invention is not limited to the exemplary embodiments shown or described. Rather, it includes refinements of the present invention within the scope of patent claims.

What is claimed is:

1. A rock drill for rotational and percussive action, with a drill head, a conveying helix, and a longitudinal drill axis, wherein the drill head includes at least one secondary cutting element with a front and a rear lateral face, and wherein the secondary cutting element has a center of mass and a cutting edge, the center of mass and the cutting edge defining a first plane, the front lateral face of the secondary cutting element defining a second plane, and the rear lateral face of the secondary cutting element defining a third plane, wherein the longitudinal drill axis intersects the first plane at a first intersection point, the longitudinal drill axis intersects a plane selected from the group consisting of the second plane, the third plane, and both at a point selected from the group consisting of a second intersecting point, a third intersecting point, and both the first plane and a plane selected from the group consisting of the second plane, the third plane, and both is inclined in a rotary direction of the drill bit, the longitudinal drill axis and the first plane form a first acute angle in the direction of advancement of the rock drill, and the longitudinal drill axis and a plane selected from the group consisting of the second plant, the third plane and both form an angle selected from the group consisting of a second angle, a third angle, and both in the direction of advancement of the rock drill, wherein the first intersecting point is located between a drill bit tip and the center of mass of the secondary cutting element, and the first acute angle is greater than the second angle.

2. The rock drill as recited in claim 1, wherein the angle between the first plane and the longitudinal drill axis is approximately 10° to 25°.

3. The rock drill as recited in claim 1, wherein the second angle between the second plane and the longitudinal drill axis is approximately 5° to 20°.

4. The rock drill as recited in claim 1, wherein the third angle between the third plane and the longitudinal drill axis is approximately 5° to 20°.

5. The rock drill as recited in claim 1, wherein the first angle between the first plane and the longitudinal drill axis is greater than the second angle between the third plane and the longitudinal drill axis.

6. The rock drill as recited in claim 1, wherein the first intersection point is located in front of the center of mass, as viewed in the direction of advancement of the rock drill.

7. The rock drill as recited in claim 1, wherein the first intersection point is located between the drill bit tip and the center of mass.

8. The rock drill as recited in claim 1, wherein a removal channel for drill cuttings is located in front of the cutting edge of the secondary cutting element as viewed in the rotation direction of the rock drill, the removal channel extending away from an end face of the drill head and into the conveying helix.

9. The rock drill as recited in claim 1, wherein the secondary cutting element is embedded in a groove formed in the drill head.

10. The rock drill as recited in claim 1, wherein lateral flanks of the groove define a fourth and fifth plane, which include a fourth and fifth intersection point with the longitudinal drill axis.

11. The rock drill as recited in claim 1, wherein the secondary cutting elements are located with mirror symmetry relative to the longitudinal drill axis.

12. The rock drill as recited in claim 1, wherein the rock drill includes a main cutting element.

13. The rock drill as recited in claim 1, wherein the secondary cutting element is a component of a solid hard-metal head.

\* \* \* \* \*